United States Patent
Gorai et al.

(10) Patent No.: US 11,689,924 B2
(45) Date of Patent: Jun. 27, 2023

(54) SYSTEM AND METHOD FOR ESTABLISHING TRUST BETWEEN MULTIPLE MANAGEMENT ENTITIES WITH DIFFERENT AUTHENTICATION MECHANISMS

(71) Applicant: VMWARE, INC., Palo Alto, CA (US)

(72) Inventors: Krishnendu Gorai, Bangalore (IN); Sandeep Sinha, Bangalore (IN); Vinod R N, Chennai (IN); Ramesh Vepuri Lakshminarayana, Bangalore (IN); Akash Kodenkiri, Bangalore (IN); Sachin Johri, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 74 days.

(21) Appl. No.: 17/334,861

(22) Filed: May 31, 2021

(65) Prior Publication Data
US 2022/0322090 A1   Oct. 6, 2022

(30) Foreign Application Priority Data
Apr. 2, 2021   (IN) .............................. 202141015769

(51) Int. Cl.
*H04W 12/06* (2021.01)
*H04W 12/0433* (2021.01)
(Continued)

(52) U.S. Cl.
CPC ..... *H04W 12/068* (2021.01); *H04W 12/0431* (2021.01); *H04W 12/0433* (2021.01); *H04W 12/69* (2021.01)

(58) Field of Classification Search
CPC ........... H04W 12/068; H04W 12/0433; H04W 12/0431; H04W 12/069; H04W 12/06; H04W 12/043; G06F 21/31; G06F 21/606
See application file for complete search history.

(56) References Cited

U.S. PATENT DOCUMENTS

| | | | |
|---|---|---|---|
| 6,934,842 B2 * | 8/2005 | Okamoto | G06Q 10/087 713/168 |
| 7,640,578 B2 * | 12/2009 | Vasnani | H04L 63/10 726/10 |

(Continued)

FOREIGN PATENT DOCUMENTS

| | | | | |
|---|---|---|---|---|
| WO | WO-2014029939 A1 * | 2/2014 | ............ | H04W 12/04 |
| WO | WO-2014143640 A1 * | 9/2014 | ............ | H04L 63/061 |

OTHER PUBLICATIONS

P. Solapurkar, "Building secure healthcare services using OAuth 2.0 and JSON web token in IOT cloud scenario," 2016 2nd International Conference on Contemporary Computing and Informatics (IC3I), 2016, pp. 99-104, doi: 10.1109/IC3I.2016.7917942.*

(Continued)

*Primary Examiner* — Lizbeth Torres-Diaz
(74) *Attorney, Agent, or Firm* — Loza & Loza, LLP (57) ABSTRACT

A system and method for establishing trust between management entities with different authentication mechanisms in a computing system utilizes a token exchange service to acquire a second security token used in a second management entity in exchange for a first security token used in a first management entity. In an embodiment, an endpoint is set at the first management entity as an authentication endpoint for the second management entity, which is used to authenticate a request with the second security token that is sent from the first management entity to the second management entity. After authentication, the request is processed at the second management entity and a response is transmitted to the first management entity.

20 Claims, 8 Drawing Sheets

(51) Int. Cl.
  *H04W 12/0431* (2021.01)
  *H04W 12/69* (2021.01)

(56) References Cited

U.S. PATENT DOCUMENTS

| | | | | |
|---|---|---|---|---|
| 7,900,247 | B2* | 3/2011 | Chong | H04L 67/02 |
| | | | | 713/171 |
| 9,825,765 | B2* | 11/2017 | Oberheide | H04L 63/102 |
| 10,547,594 | B2* | 1/2020 | Chang | H04L 63/0807 |
| 10,630,682 | B1* | 4/2020 | Bhattacharyya | H04L 63/061 |
| 10,904,234 | B2* | 1/2021 | Ross | H04L 63/0442 |
| 11,108,762 | B2* | 8/2021 | Dunjic | H04L 9/3213 |
| 2008/0072301 | A1* | 3/2008 | Chia | H04L 63/0815 |
| | | | | 726/8 |
| 2009/0271847 | A1* | 10/2009 | Karjala | H04L 63/0807 |
| | | | | 726/6 |
| 2015/0082025 | A1* | 3/2015 | Deshpande | H04W 12/069 |
| | | | | 713/155 |
| 2015/0350168 | A1* | 12/2015 | Hayton | G06F 21/32 |
| | | | | 713/168 |
| 2020/0007530 | A1* | 1/2020 | Mohamad Abdul | |
| | | | | H04W 12/009 |
| 2022/0322090 | A1* | 10/2022 | Gorai | H04W 12/0433 |

OTHER PUBLICATIONS

Chadwick, D.W., Siu, K., Lee, C., Fouillat, Y. and Germonville, D., 2014. Adding federated identity management to openstack. Journal of Grid Computing, 12(1), pp. 3-27.*

P. Solapurkar, "Building secure healthcare services using OAuth2.0 and JSON web token in IOT cloud scenario," 2016 2nd International Conference on Contemporary Computing and Informatics (IC3I), 2016, pp. 99-104, doi: 10.1109/IC3I.2016.7917942.*

* cited by examiner

SYSTEM AND METHOD FOR ESTABLISHING TRUST BETWEEN MULTIPLE MANAGEMENT ENTITIES WITH DIFFERENT AUTHENTICATION MECHANISMS

RELATED APPLICATIONS

Benefit is claimed under 35 U.S.C. 119(a)-(d) to Foreign Application Serial No. 202141015769 filed in India entitled "SYSTEM AND METHOD FOR ESTABLISHING TRUST BETWEEN MULTIPLE MANAGEMENT ENTITIES WITH DIFFERENT AUTHENTICATION MECHANISMS", on Apr. 2, 2021, by VMware, Inc., which is herein incorporated in its entirety by reference for all purposes.

BACKGROUND

Computing networks, such as software-defined data centers (SDDCs), includes multiple management entities that support the computing environments of the networks. These management entities may need to work with each other for certain unified solutions and/or to provide better user experience. For example, an SDDC may include a virtualization manager that manages a cluster of host computers and a software-defined network (SDN) manager that manages SDN components in the SDDC to provide logical networking services, which may operate together to provide capabilities for managing containers in the SDDC.

Most of the management entities within a computing network require user authentication and authorization to execute workload management operations. However, if the management entities have different mechanisms for authentication, then service level communications between the management entities may present challenges, such as when a service running on one management entity needs to call a Representation State Transfer (REST) application programming interface (API) on another management entity. Thus, there is a need to establish trust between management entities with different authentication mechanisms to reduce multiple user-involved authentications.

SUMMARY

A system and method for establishing trust between management entities with different authentication mechanisms in a computing system utilizes a token exchange service to acquire a second security token used in a second management entity in exchange for a first security token used in a first management entity. In an embodiment, an endpoint is set at the first management entity as an authentication endpoint for the second management entity, which is used to authenticate a request with the second security token that is sent from the first management entity to the second management entity. After authentication, the request is processed at the second management entity and a response is transmitted to the first management entity.

A computer-implemented method for establishing trust between management entities with different authentication mechanisms in a computing system comprises setting an endpoint at a first management entity as an authentication endpoint for a second management entity, wherein the first management entity uses a first token-based authentication mechanism and the second management entity uses a second token-based authentication mechanism, creating a first account in the first management entity and a corresponding second account in the second management entity, acquiring a first security token at the first management entity using the first account to access the second management entity, acquiring a second security token from a token exchange service at the first management entity in exchange for the first security token, sending a request with the second security token from the first management entity to the second management entity using the second account, in response to the request, retrieving a public key from the first management entity by the second management entity using the authentication endpoint, validating the second security token using the public key at the second management entity, after validating the second security token, processing the request at the second management entity, and after processing the request, sending a response to the request back to the first management entity from the second management entity. In some embodiments, the steps of this method are performed when program instructions contained in a non-transitory computer-readable storage medium are executed by one or more processors.

A system in accordance with an embodiment of the invention comprises memory and at least one processor configured to set an endpoint at a first management entity as an authentication endpoint for a second management entity, wherein the first management entity uses a first token-based authentication mechanism and the second management entity uses a second token-based authentication mechanism, create a first account in the first management entity and a corresponding second account in the second management entity, acquire a first security token at the first management entity using the first account to access the second management entity, acquire a second security token from a token exchange service at the first management entity in exchange for the first security token, send a request with the second security token from the first management entity to the second management entity using the first account, in response to the request, retrieve a public key from the first management entity by the second management entity using the authentication endpoint, validate the second security token using the public key at the second management entity, after the second security token has been validated, process the request at the second management entity, and after the request has been processed, send a response to the request back to the first management entity from the second management entity.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The embodiments of the invention are illustrated by way of example, and not by way of limitation, in the figures of the accompanying drawings in which.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
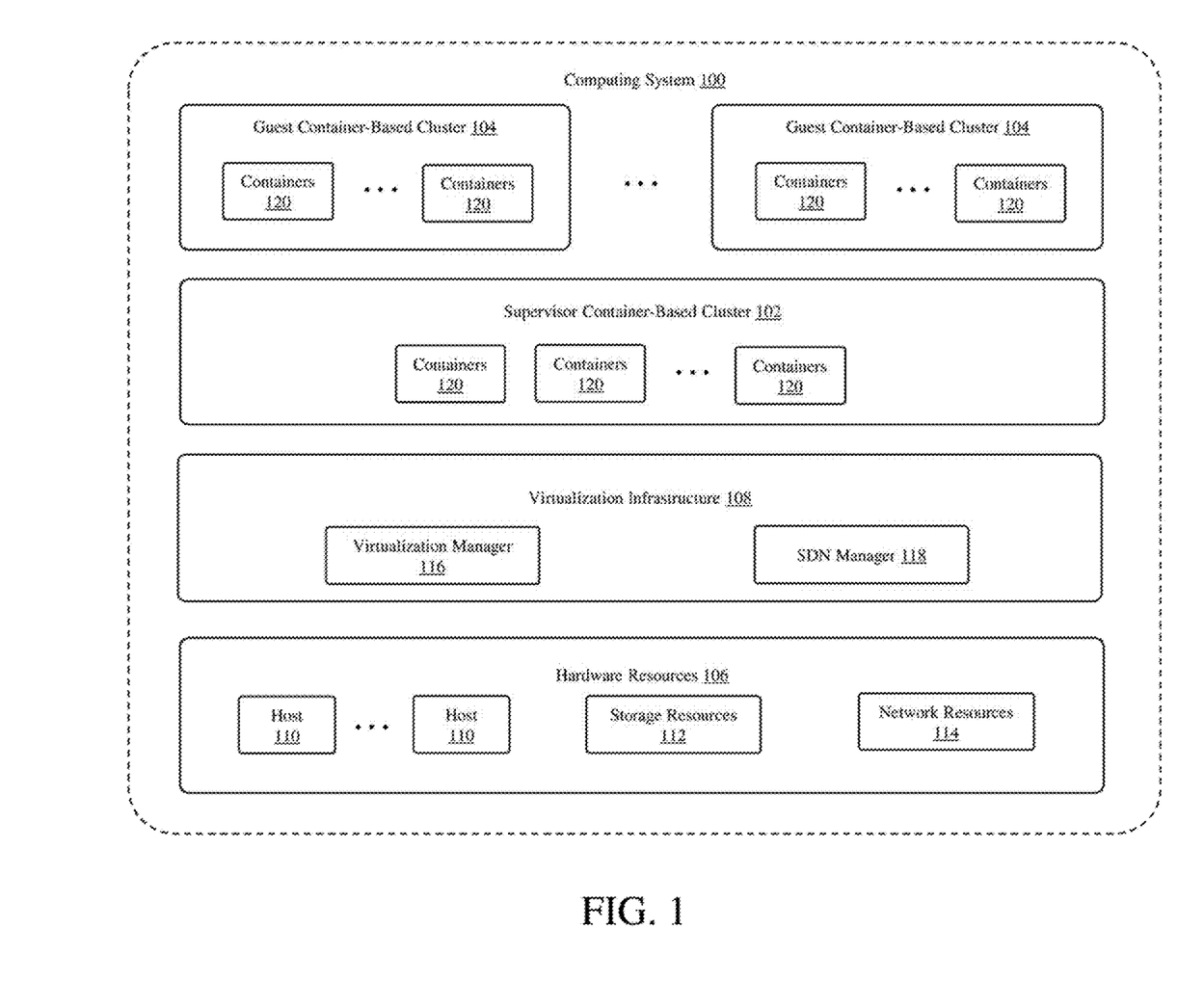
FIG. 1 is a block diagram of a computing system in accordance with an embodiment of the invention.

Turning now to FIG. 1, a computing system 100 in which embodiments of the invention can be implemented is illustrated. As shown in FIG. 1, the computing system 100 includes a supervisor container-based cluster 102 and a number of guest container-based clusters 104, which are supported by hardware resources 106 and a virtualization infrastructure 108. The supervisor and guest container-based clusters 102 and 104 are computing environments that offer compute, storage and network as resources for hosting or deployment of services or applications. In an embodiment, the supervisor and guest container-based clusters 102 and 104 may be Kubernetes® clusters. However, in other embodiments, the supervisor and guest container-based clusters 102 and 104 may be another type of container-based cluster based on container technology, such as Docker® clusters. The virtualization infrastructure 108 includes multiple management entities that manage the computing environment of the computing system 100. As explained in detail below, the computing system 100 utilizes techniques to establish trust between at least some of these management entities that have different authentication mechanisms, which allows for better unified solutions that involve multiple management entities and also provides better user experience.

The hardware resources 106 of the computing system 100 include host computers (hosts) 110, physical storage resources 112 and physical network resources 114. These hardware resources may be provided by a cloud provider if the supervisor and guest container-based clusters 102 and 104 are deployed in a public cloud. Alternatively, these hardware resources may be part of an on-premises data center. Each of the hosts includes hardware components commonly found on a server grade computer, such as CPU, memory, network interface card and one or more storage devices. In addition, each host includes a virtualization layer that abstracts processor, memory, storage, and networking resources of the host's hardware into virtual machines that run concurrently on the host. In an embodiment, the virtual machines run on top of a hypervisor that enables sharing of the hardware resources of the host by the virtual machines. One example of a hypervisor may be used in the hosts is a VMware ESXi™ hypervisor provided as part of the VMware vSphere® solution made commercially available from VMware, Inc. The hypervisor of each host may run on top of the operating system of the host or directly on hardware components of the host.

The physical storage resources 112 may include the storage devices of the hosts 110 and/or other storage devices, which may be part of a storage system, such as a physical or virtual storage area network (SAN) or a network-attached storage (NAS).

The physical network resources 114 may include physical switches, physical routers and/or physical gateways. The physical switches provide connectivity between various components in the computing system 100. The physical routers perform packet forwarding functions to ensure data are transmitted to their intended destinations. The physical gateways serve as junctions between the computing system 100 and other networks, such as other data centers and the Internet.

The virtualization infrastructure 108 of the computing system 100 provides virtualization to provision virtual compute, storage and network resources for the supervisor and guest container-based clusters 102 and 104 from the hardware resources 106. In addition, the virtualization infrastructure 108 may provide various capabilities and services for the components in the computing system 100. In the illustrated embodiment, the virtualization infrastructure 108 includes a virtualization manager 116 and a software-defined network (SDN) manager 118. However, in other embodiments, the virtualization infrastructure may include other management entities that support the supervisor and guest container-based clusters 102 and 104.

The virtualization manager 116 is configured to carry out administrative tasks for the computing system 100, including managing at least some of the hosts 110 as a cluster of hosts, managing various virtual computing instances (VCIs), such as virtual machines and containers running on the hosts in the cluster, provisioning new VCIs, migrating VCIs from one host to another host, and load balancing between the hosts. In an embodiment, the virtualization manager 116 may be configured to provide these functionalities in a public cloud computing environment. In some embodiment, the virtualization manager 116 may be implemented as software running in a VCI, such as a virtual machine running on one of the hosts 110, or in any computer system. One example of the virtualization manager 116 is the VMware vCenter Server® product that is available from VMware, Inc.

The SDN manager 118 is configured to provide a graphical user interface (GUI) and REST APIs for creating, configuring, and monitoring SDN components and resources, such as logical switches, edge services gateways, load balancers, virtual servers, server pools and pool members. Thus, the SDN manager can be viewed as a resource provider that can provide various resources for different components of the computing system 100, such as the supervisor and guest container-based clusters 102 and 104. The SDN manager allows configuration and orchestration of logical network components for logical switching and routing, networking and edge services, load balancing, and security services and distributed firewall (DFW). In an embodiment, the SDN manager may be configured to provide these functionalities in a public cloud computing environment. In some embodiments, the SDN manager 118 may be implemented as software running in a VCI, such as a virtual machine running on one of the hosts 110, or in any computer system. One example of the SDN manager is the NSX® manager of VMware NSX-T product that is available from VMware, Inc.

In an embodiment, the virtualization manager 116 and the SDN manager 118 provide support for the supervisor container-based cluster 102 to be created and execute supervisory functionalities. The supervisor container-based cluster includes multiple containers 120 that run various software processes or applications. A container is a package that relies on virtual isolation to deploy and run applications that access a shared operating system (OS) kernel. An example of a container is the container created using a Docker engine made available by Docker, Inc.

The supervisor container-based cluster 102 is configured to create and manage one or more guest container-based clusters 104, which also include containers 120, using compute, network and storage resources available to the supervisor container-based cluster. Since guest container-based clusters are created by the supervisor container-based cluster, each of the guest container-based clusters can be viewed as a child container-based cluster and the supervisor container-based cluster can be viewed as the parent container-based cluster of that guest container-based cluster.

In some embodiments, the supervisor and guest container-based clusters 102 and 104 are Kubernetes® clusters that are deployed using containers running on virtual machines, which are hosted in a logical cluster of the host computers 110. As used herein, a virtual machine is an emulation of a physical computer system in the form of a software computer that, like a physical computer, can run an operating system and applications, including containers. A virtual machine may be comprised of a set of specification and configuration files and is backed by the physical resources of the physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, Calif. A host computer 200 with containers running in one or more virtual machines in accordance with an embodiment of the invention, which is representative of the host computers 110 in the computing system 100 is illustrated in FIG. 2.

Figure 2:
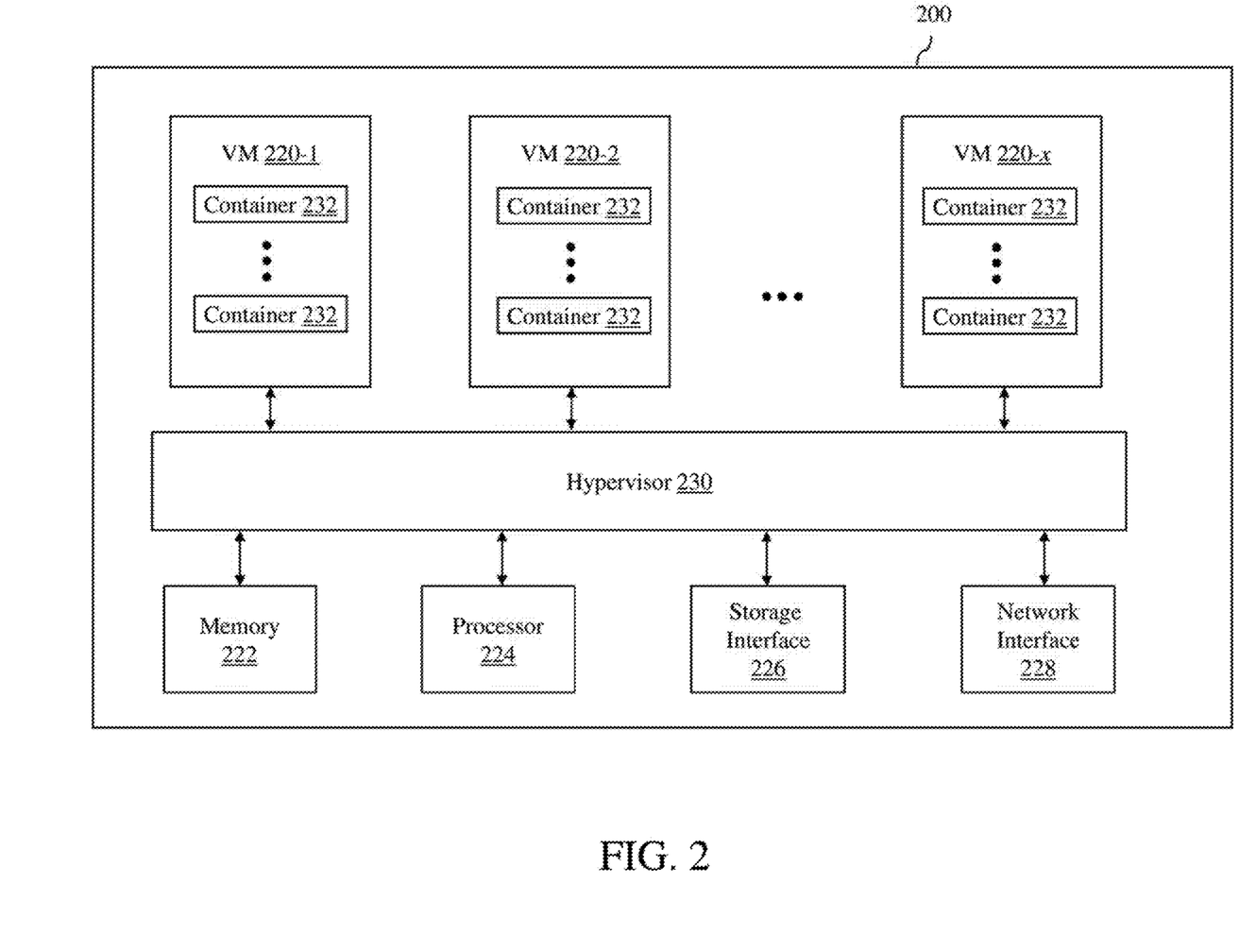
FIG. 2 is a block diagram of a host computer with containers running in one or more virtual machines in accordance with an embodiment of the invention, which is representative of the host computers in the computing system.

As shown in FIG. 2, the host computer 200 is configured to support a number of virtual machines (VMs) 220-1, 220-2 . . . 220-x (where x is a positive integer). The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with a local or external storage (not shown). As an example, the storage interface may be a host bus adapter or a network file system interface. The network interface 228 is an interface that allows the host computer to communicate with other devices and systems through one or more networks. As an example, the network interface may be a network interface controller (NIC).

In the illustrated embodiment, the VMs 220-1, 220-2 . . . 220-x run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for one or more containers 232.

The VMs 220-1, 220-2 . . . 220-x, as well as the containers 232 running in the VMs, are able to communicate with each other using an internal software OSI Layer 2 switch (not shown) and with other computer systems or components connected to the host computer via a network using the network interface 228 of the host computer 200. In addition, the VMs, as well as the containers running in the VMs, are able to access storage using the storage interface 226 of the host computer.

Figure 3:
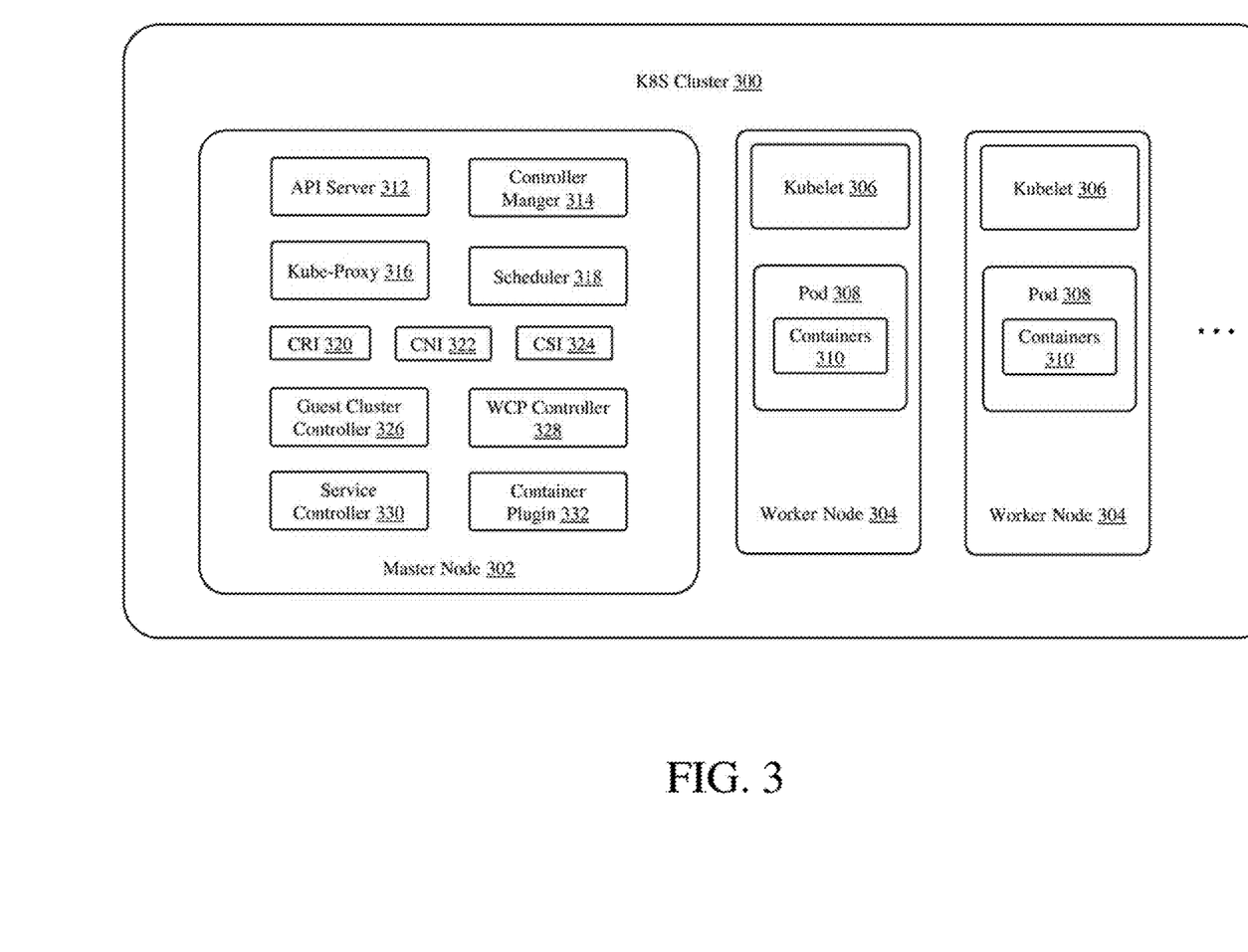
FIG. 3 is a block diagram of an exemplary Kubernetes® (K8S®) cluster in accordance with an embodiment of the invention, which can be deployed as a supervisor or guest container-based cluster of the computing system.

Turning now to FIG. 3, an exemplary Kubernetes® (K8S®) cluster 300 in accordance with an embodiment of the invention, which can be deployed as the supervisor container-based cluster 102 or one of the guest container-based clusters 104 of the computing system 100, is illustrated. As shown in FIG. 3, the K8S cluster 300 includes a master node 302 and a number of worker nodes 304. Each worker node 304, or worker compute machine, includes a kubelet 306 that runs one or more pods 308 in the worker node. Each pod 308 may include one or more containers 310. The worker nodes can be used to execute various applications and software processes using the containers. The master node 302 includes an API server 312 and a controller manager 314. The API server 312 operates as a gateway to the K8S cluster 300, which can be accessed by users, automation and components in the K8S cluster. The controller manager 314 operates to monitor the API server 312, and execute various operations in response to certain events. If the K8S cluster 300 is a guest container-based cluster, the controller manager 314 may execute certain operations when services are requested for the cluster.

The master node 302 may include other components, such as a kube-proxy 316, a scheduler 318, a container runtime interface (CRI) 320, a container network interface (CNI) 322 and a container storage interface (CSI) 324, which are well-known components of a K8S cluster. The kube-proxy 316 is a Kubernetes network proxy that proxies User Datagram Protocol (UDP), Transmission Control Protocol (TCP) and Stream Control Transmission Protocol (SCTP), provides load balancing and can be used to reach services. There may be kube-proxy in each of the worker nodes. The scheduler 318 operates to make sure that the pods are matched to the nodes in the K8S cluster 300 so that the kubelets 306 can run them. The CRI 320, CNI 322 and CSI 324 provide compute, network and storage resources for the containers 310 in the K8S cluster.

If the K8S cluster 300 is a supervisor container-based cluster, the K8S cluster has additional components, which include at least a guest cluster controller 326, a workload control plane (WCP) controller 328, a service controller 330 and a container plugin 332, as shown in FIG. 3. These components enable the K8S cluster 300 to execute various operations as the supervisor container-based cluster to create and manage one or more guest container-based clusters 104, and to enable various capabilities for the guest container-based clusters.

The guest cluster controller 326 operates to manage the lifecycle of guest container-based clusters created by the K8S cluster 300 as the supervisor container-based cluster. Thus, the guest cluster controller can create, manage and delete guest container-based clusters. In an embodiment, the guest cluster controller may be a Tanzu Kubernetes cluster controller provided by a vSphere® with Kubernetes product, which is available from VMware, Inc.

The workload control plane controller 328 operates to enable various capabilities for the guest container-based clusters created through the K8S cluster 300 as the supervisor container-based cluster. In particular, the workload control plane controller can create virtual machine service software objects to enable capabilities for the guest container-based clusters. In an embodiment, the guest cluster controller may be a Cluster API for Workload Control Plane (CAPW) controller provided by a vSphere with Kubernetes product, which is available from VMware, Inc.

The service controller 330 operates to monitor the virtual machine service software objects created by the workload control plane controller 328 and uses the specifications defined in the virtual machine service software objects to create and configure various VMs. In particular, the service controller may create various software objects for services that correspond to the virtual machine service software objects created by the workload control plane controller. In an embodiment, the service controller may be a virtual machine operator (VMOP) provided by a vSphere with Kubernetes product, which is available from VMware, Inc.

The container plugin 332 is a controller that watches for certain software objects created in the K8S cluster 300 functioning as the supervisor container-based cluster and orchestrates the creation of corresponding resources by an external resource provider, which may be the SDN manager 118 in the computing system 100. The corresponding resources are dependent on the resource provider. Thus, the container plugin is designed or programmed to send provider-specific instructions to a particular resource provider that can create the needed resources. In order to send the correct provider-specific instructions for the software objects created in the supervisor container-based cluster, the container plugin maps each of the software objects to one or more provider-specific resources that need to be created by the resource provider. Once the provider-specific resources are determined, appropriate instructions can be sent to the resource provider so that the provider-specific resources can be created by the resource provider.

For some capabilities or functionalities of the K8S cluster 300 as a supervisor or guest container-based cluster, multiple management entities running in the computing system 100 may need to operate together to facilitate these capabilities or functionalities. For example, the virtualization manager 116 and the SDN manager 118 may have to work together to provide Kubernetes capabilities for managing containers and virtual machines in the supervisor and guest container-based clusters 102 and 104. However, if the management entities use different authentication mechanisms, such cooperative operation may be challenging. In order for the management entities in the computing system 100 to work together more efficiently, some of the management entities employ a technique to establish trust between the management entities. This trust establishing technique is described herein using the virtualization manager 116 and the SDN manager 118 as exemplary management entities.

Figure 4:
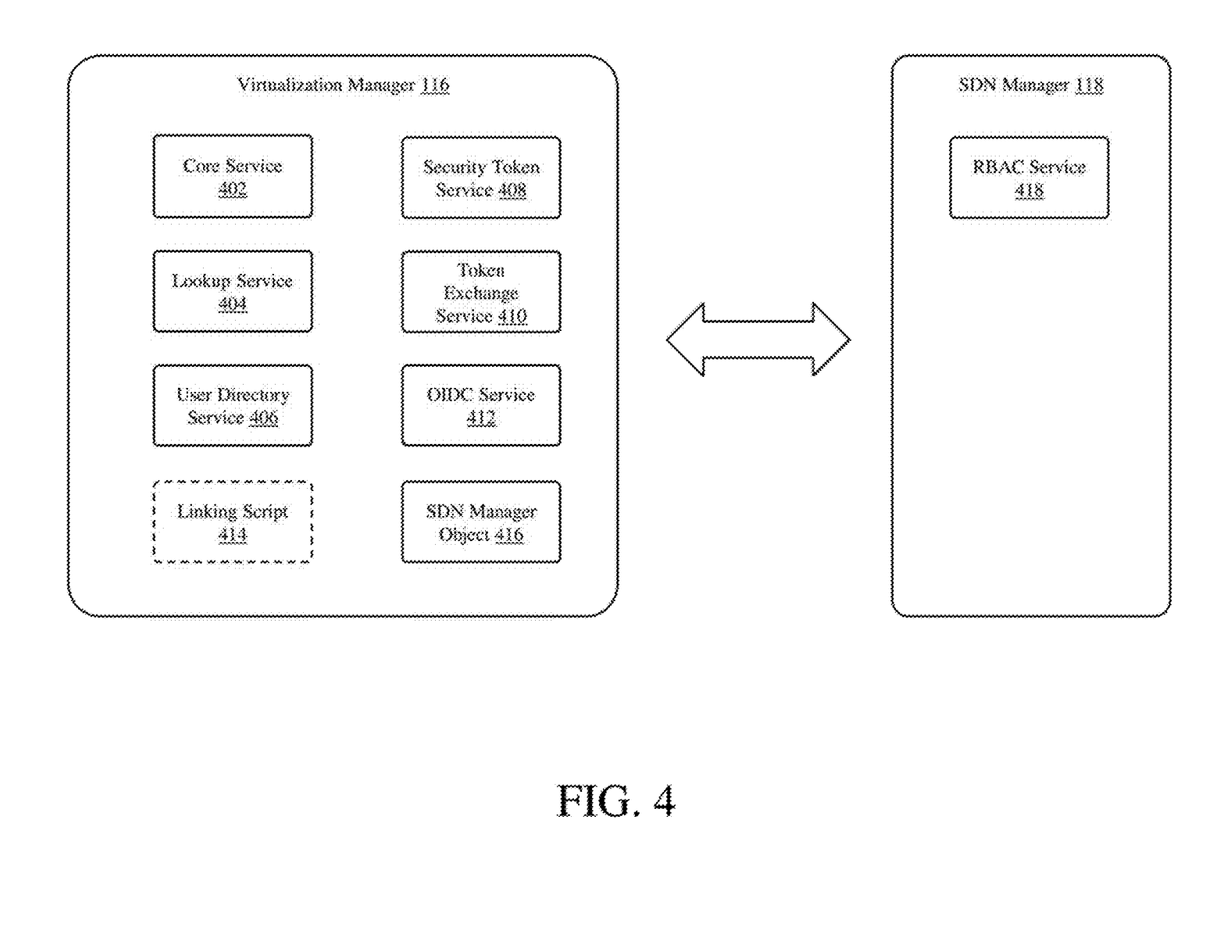
FIG. 4 is a block diagram of components of a virtualization manager and a software-defined network manager of the computing system that are used to establish trust between the two managers having different authentication mechanisms in accordance with an embodiment of the invention.

Turning now to FIG. 4, components of the virtualization manager 116 and the SDN manager 118 of the computing system 100 that are used to establish trust between the two managers having different authentication mechanisms in accordance with an embodiment of the invention are shown. In this embodiment, the virtualization manager 116 uses a security assertion markup language (SAML) token-based authentication mechanism, while the SDN manager 118 uses a JavaScript Object Notation (JSON) Web Token (JWT)-based authentication mechanism. As depicted in FIG. 4, the virtualization manager 116 includes a core service 402, a lookup service 404, a user directory service 406, a security token service 408, a token exchange service 410 and an OIDC service 412. These components of the virtualization manager 116 may be implemented as software running on the virtualization manager. Also illustrated in FIG. 4 are a linking script 414 in the virtualization manager that is executed when the SDN manager 118 is installed in the computing system 100 and an SDN manager object 416, which represents the SDN manager 118 in the virtualization manager, for example, as a daemon. Although not illustrated, the virtualization manager 116 includes additional components that provide other services and/or functionality, for example, services and/or functionalities provided by a vCenter server® entity.

The core service 402 of the virtualization manager 116 operates to provide various core functionalities to the virtualization manager. As an example, the core service is responsible for creating a cluster of hosts, adding hosts to the cluster and removing hosts from the cluster. In addition, the core service is responsible for registering external entities as extensions of the virtualization manager, which allow the external entities certain privileges to interact with the virtualization manager. In a particular implementation where the virtualization manager 116 is a vCenter server® appliance, the core service is a virtual provisioning x daemon (VPXD).

The lookup service 404 of the virtualization manager 116 operates to allow registration of components connecting to the virtualization manager to allow these components to find one another and communicate securely. Thus, the lookup service records or stores various information of registered components, such as names and endpoints, e.g., internet protocol (IP) addresses, of the registered components.

The user directory service 406 of the virtualization manager 116 operates to maintain account information of registered users of the virtualization manager. Thus, the user directory service allows users to register to access the virtualization manager 116. The user directory service facilitates Single Sign-On (SSO) using SAML tokens for authentication to access the virtualization manager 116.

The security token service 408 of the virtualization manager 116 operates to issue, validate and renew security tokens. The security token service allows users to present their credentials to acquire SAML tokens. The credentials needed to acquire the SAML tokens depend on the type of users.

The token exchange service 410 of the virtualization manager 116 operates to issue one type of security token in exchange for another security token. Thus, token exchange service maintains a record of the relationship between the associated security tokens. In an embodiment, the token exchange service issues a SAML token in exchange for a JWT token. However, in other embodiments, the token exchange service may issue a SAML token or a different security token for another type of security token. In an embodiment, the issued token may indicate the role of the user for access. Thus, an issued token may indicate that the user has administrator or full access or a limited access.

The OIDC service 412 of the virtualization manager 116 operates to facilitate OpenID connect (OIDC) authentication, which is based on OAuth 2.0 specifications. As part of this authentication process, the OIDC service maintain one or more OIDC public keys that can be used to validate JWT tokens for authentication. The OIDC service can be reached by an external entity using the endpoint of the OIDC service, which can be viewed as an authentication endpoint for the external entity.

The linking script 414 shown in FIG. 4 is a script that is invoked when the SDN manager 118 is installed in the computing system 100. The linking script includes a sequence of instructions to link the SDN manager 118 to the virtualization manager 116 so that trust can be established between the two entities. The linking script 414 is described in detail below with respect to FIG. 5.

In FIG. 4, the SDN manager 118 is illustrated with a role-based access control (RBAC) service 418, which handles authorization for access at the SDN manager based on role of the users. The RBAC service relies on credentials of users for authorization, which may include user identification (e.g., username) and/or password. Although not illustrated, the SDN manager 118 includes additional components that provide other services and/or functionality.

The overall process of establishing trust between the virtualization manager 116 and the SDN manager 118 of the computing system 100 in accordance with an embodiment of the invention involves (1) a process of linking the SDN manager to the virtualization manager, and then (2) a process of authenticating a communication from the virtualization manager to the SDN manager. Thus, the virtualization manager 116 can readily interact with the SDN manager 118 so that the two management entities can work together to provide various services or functionalities within the computing system 100. In addition, the established trust between the virtualization manager 116 and the SDN manager 118 allows users to access the SDN manger through the virtualization manager using, for example, a user interface (UI) plugin installed in the virtualization manager.

Figure 5:
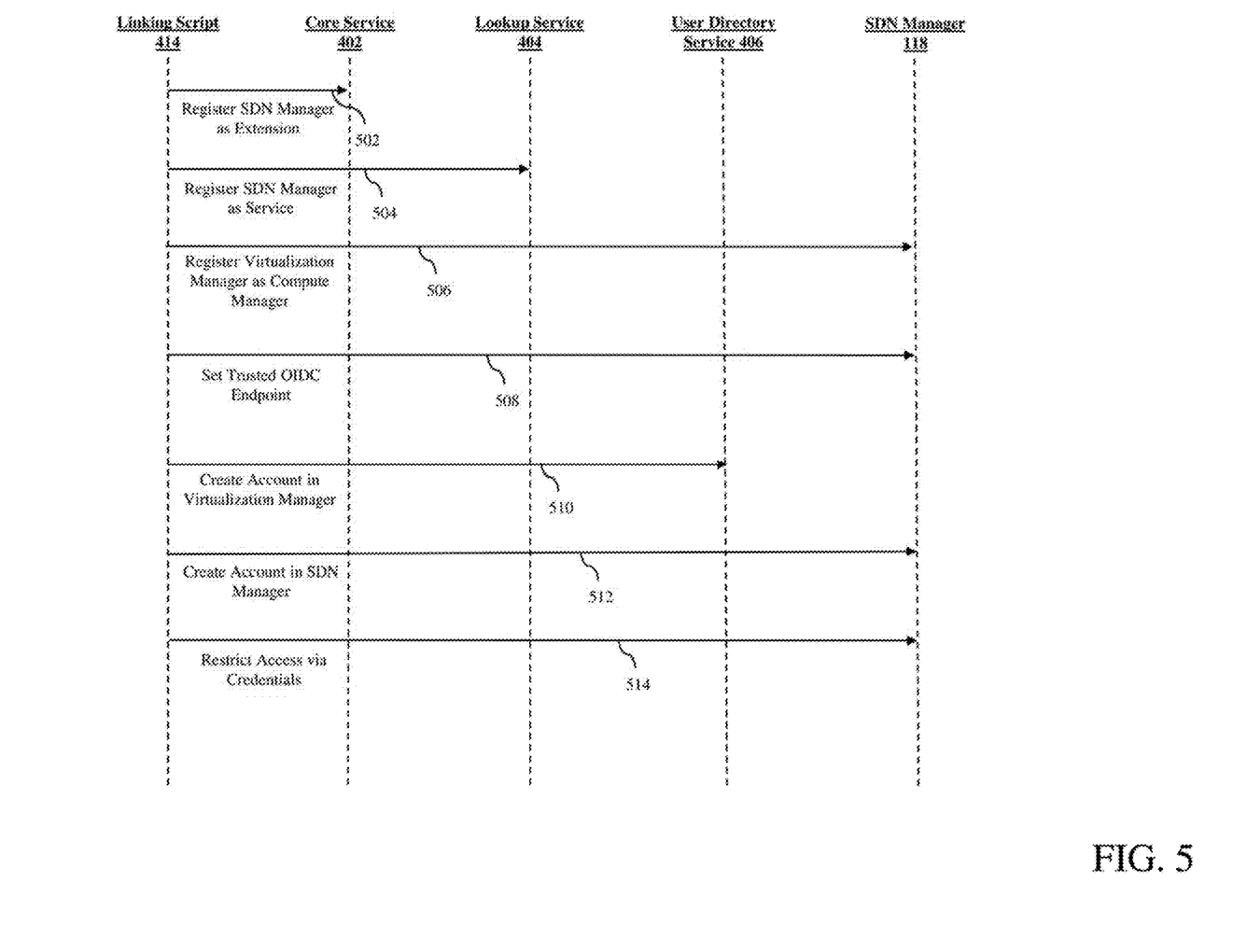
FIG. 5 is a flow diagram illustrating a process of linking the SDN manager to the virtualization manager in accordance with an embodiment of the invention.

Turning now to FIG. 5, a flow diagram illustrating a process of linking the SDN manager 118 to the virtualization manager 116 in accordance with an embodiment of the invention is shown. This process is executed by the linking script 414 when the SDN manager 118 is being installed in the computing system 100, for example, on a virtual machine in the computing system, after the virtualization manager has already been installed in the computing system.

The linking process begins at step 502, where the SDN manager 118 is registered with the core service 402 as an extension of the virtualization manager 116 by the linking script 414. In a particular implementation where the virtualization manager 116 is a vCenter server® appliance, the SDN manager 118 is registered as a vCenter extension.

Next, at step 504, the SDN manager 118 is registered with the lookup service 404 as a service to connect with the virtualization manager 116 by the linking script 414. As part of this registration, the endpoint of the SDN manager 118, such as an IP address of the SDN manager, is recorded by the lookup service 404. As a result, the SDN manager 118 is now discoverable to the virtualization manager 116 or to other entities via the virtualization manager 116.

Next, at step 506, the virtualization manager 116 is registered with the SDN manager 118 as a compute manager for the SDN manager by the linking script 414. A compute manager is an application that manages resources, such as hosts and virtual machine. This registration allows the SDN manager to collect cluster information from the virtualization manager.

Next, at step 508, the virtualization manager 116 is set as a trusted OIDC endpoint for the SDN manager 118 by the linking script 414. This will allow the SDN manager to pull a certificate, which includes an OIDC public key, from the virtualization manager to validate a token generated by the virtualization manager.

Next, at step 510, a new service account in the virtualization manager 116 is created for the SDN manager 118 at the user directory service 406 by the linking script 414 using a username, for example, "nsxd-<vc-guid>". This service account will be assigned an access role that is same as the access role for a corresponding account in the SDN manager 118.

Next, at step 512, a new account is created in the SDN manager 118 for the same username, e.g., "nsxd-<vc-guid>", with the role of enterprise administrator by the linking script 414, as the new account in the virtualization manager 116. Thus, this account created in the SDN manager 118 corresponds to the new service account created in the virtualization manager at step 510.

Next, at step 514, the newly created account in the SDN manager 118 is access restricted to credentials, such as username and/or password, by the linking script 414. Thus, the account in the SDN manager 118 cannot be access without the proper credentials.

This completes the process of linking the SDN manager 118 to the virtualization manager 116. After this process has been successfully executed, the SDN manager 118 can be securely accessed by the virtualization manager 116 or by a user via the virtualization manager without any input from the user. That is, user authentication and authorization to the SDN manager 118 are not needed.

Figure 6:
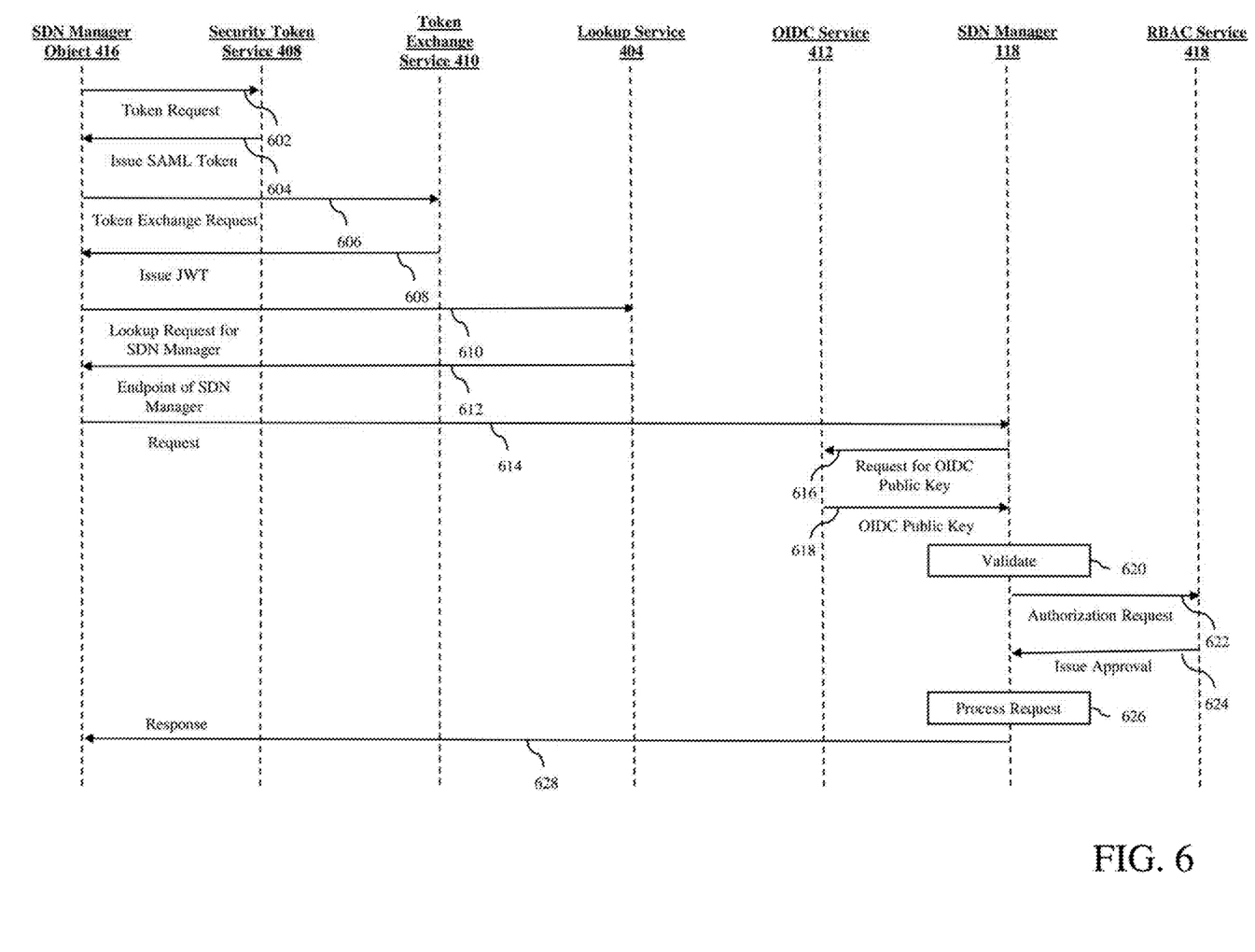
FIG. 6 is a flow diagram illustrating a process of authenticating a communication from the virtualization manager to the SDN manager in accordance with an embodiment of the invention.

Turning now to FIG. 6, a flow diagram illustrating a process of authenticating a communication from the virtualization manager 116 to the SDN manager 118 in accordance with an embodiment of the invention is shown. This process is initiated from the virtualization manager 116 using the SDN manager object 416 running in the virtualization manager. In some use cases, this process may be performed when a user is trying to invoke an API of the SDN manager 118 via the virtualization manager 116.

The process begins at step 602, where a token request for a SAML token is made to the security token service 408 by the SDN manager object 416 using the username of the account that was created in the virtualization manager, for example, the username "nsxd-<vc-guid>". Since the virtualization manager 116 uses a SAML token-based authentication mechanism and the SDN manager 118 uses a JWT-based authentication mechanism, the SAML token is valid on the virtualization manager 116, but not valid on the SDN manager 118. Next, at step 604, in response to the token request, a SAML token is issued by the security token service 408 to the SDN manager object 416. In an embodiment, the SAML token may specify an audience restriction for the SAML token.

Next, at step 606, a token exchange request is made to the token exchange service 410 to exchange the SAML token for a JWT token by the SDN manager object 416. Since the virtualization manager 116 uses a SAML token-based authentication mechanism and the SDN manager 118 uses a JWT-based authentication mechanism, the JWT token is valid on the SDN manager 118, but not valid on the virtualization manager 116. Next, at step 608, in response to the token exchange request, a JWT token is issued to the SDN manager object 416 in exchange for the SAML token by the token exchange service 410. In an embodiment, the username and the role associated with the username, i.e., an enterprise administrator, are included in the JWT token.

Next, at step 610, a lookup request for the endpoint of the SDN manager 118 is made to the lookup service 404 by the SDN manager object 416. Since the SDN manager was registered with the lookup service 404 during the linking process, the lookup service 404 is now able to find the endpoint for the SDN manager 118, which may be an IP address. Next, at step 612, in response to the lookup request, the endpoint of the SDN manager 118 is transmitted to the SDN manager object 416 from the lookup service 404.

Next, at step 614, a request with the JWT token embedded is transmitted to the SDN manager 118 from the SDN manager object 416 using the endpoint of the SDN manager 118. The request is made using the username of the account that was created in the SDN manager 118, for example, the username "nsxd-<vc-guid>". The request may be any request made to the SDN manager 118, which may be an API request.

Next, at step 616, in response to the request with the JWT token, a request for an OIDC public key is made to the OIDC service 412 from the SDN manager 118 using the OIDC endpoint. Since a trusted OIDC endpoint for the SDN manager 118 was set during the linking process, the OIDC endpoint can now be used to retrieve the OIDC public key for authentication. Next, at step 618, in response to the key request, an OIDC public key for the JWT token is transmitted to the SDN manager 118 from the OIDC service 412. the Next, at step 620, the JWT token embedded in the request from the SDN manager object 416 is validated by the SDN manager 118 using the OIDC public key. If the JWT token cannot be validated using the retrieved OIDC public, then the process may be aborted. However, if the JWT token is validated, the process is continued.

Next, at step 622, an authorization request is made by the SDN manager 118 to the role-based access control 418 using the user credentials and/or the role claimed in the JWT token, which are used by the role-based access control to determine whether the request is authorized for the user. Next, at step 624, if authorized, an approval of the authorization request is issued by the role-based access control 418. If the request is not authorized, then the process may be aborted.

Next, at step 626, if approved, the request from the SDN manager object 416 is processed by the SDN manager. Next, at step 628, a response to the request is transmitted back to the SDN manager object 416 from the SDN manager 118, which completes the process of authenticating a communication from the virtualization manager 116 to the SDN manager 118.

The trust establishing technique described herein is not limited to a virtualization manager and an SDN manager, and thus, may be used to establish trust between other management entities having different authentication mechanisms. In addition, the trust establishing technique described herein is not limited to management entities with SAML token-based and JWT-based authentication mechanisms, but may be used for management entities with different token-based authentication mechanisms, which would require appropriate modifications to the token exchange service 410 to accommodate the different tokens for exchange.

Figure 7:
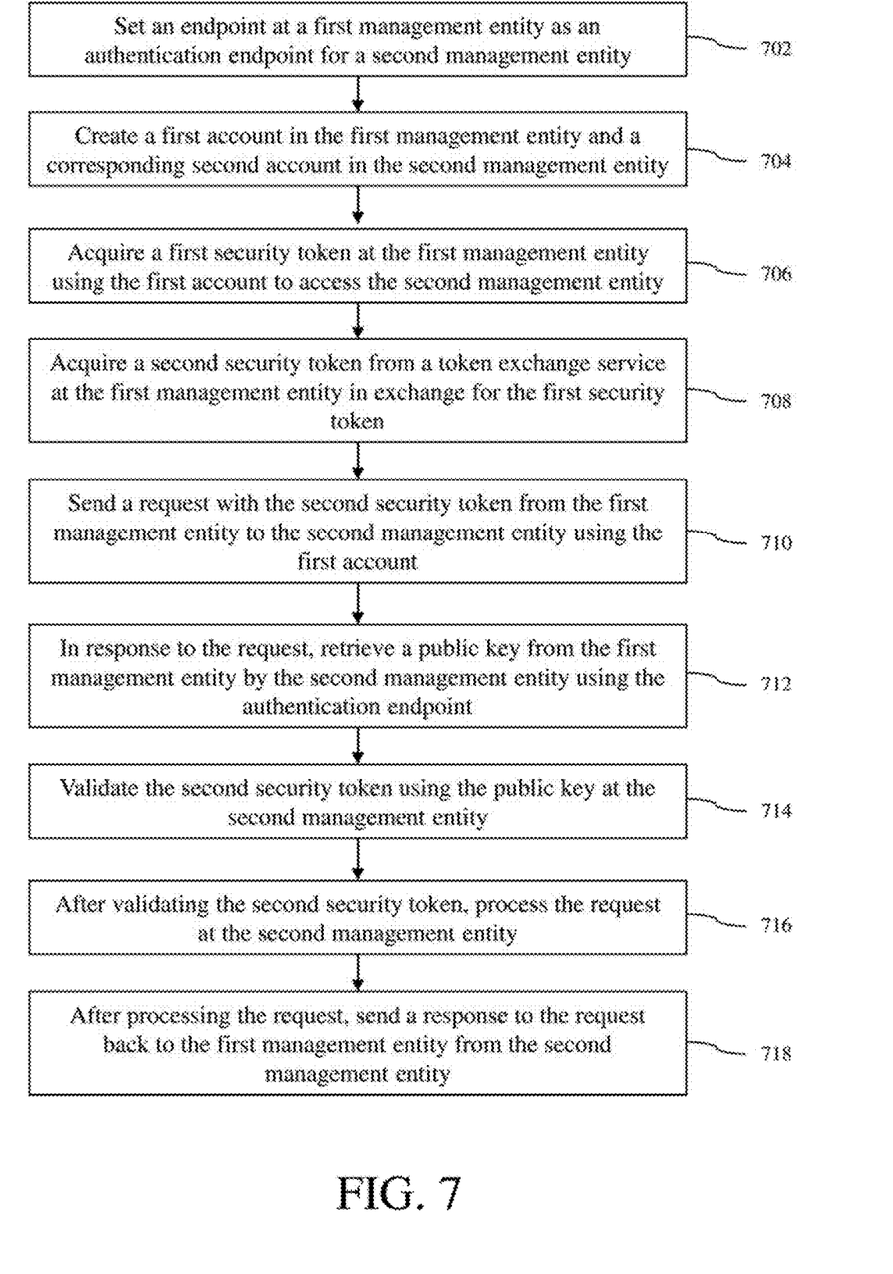
FIG. 7 is a process flow diagram of a computer-implemented method for computer-implemented method for establishing trust between management entities with different authentication mechanisms in a computing system in accordance with an embodiment of the invention.

A computer-implemented method for establishing trust between management entities with different authentication mechanisms in a computing system in accordance with an embodiment of the invention is described with reference to a flow diagram of FIG. 7. At block 702, an endpoint at a first management entity is set as an authentication endpoint for a second management entity, which may be an OIDC endpoint. The first management entity uses a first token-based authentication mechanism and the second management entity uses a second token-based authentication mechanism. As an example, the first management entity may be a virtualization manager and the second management entity may be an SDN manager. At block 704, a first account is created in the first management entity and a corresponding second account is created in the second management entity, for example, using the same user identification for both accounts. At block 706, a first security token is acquired at the first management entity to access the second management entity. As an example, the first security token may be a SAML token. At block 708, a second security token is acquired from a token exchange service at the first management entity in exchange for the first security token. As an example, the second security token may be a JWT token. At block 710, a request with the second security token is sent from the first management entity to the second management entity. At block 712, in response to the request, a public key is retrieved from the first management entity by the second management entity using the authentication endpoint. As an example, the retrieved public key may be an OIDC public key. At block 714, the second security token is validated using the public key at the second management entity. At block 716, after validating the second security token, the request is processed at the second management entity. At block 718, after processing the request, a response to the request is sent back to the first management entity from the second management entity.

Figure 8:
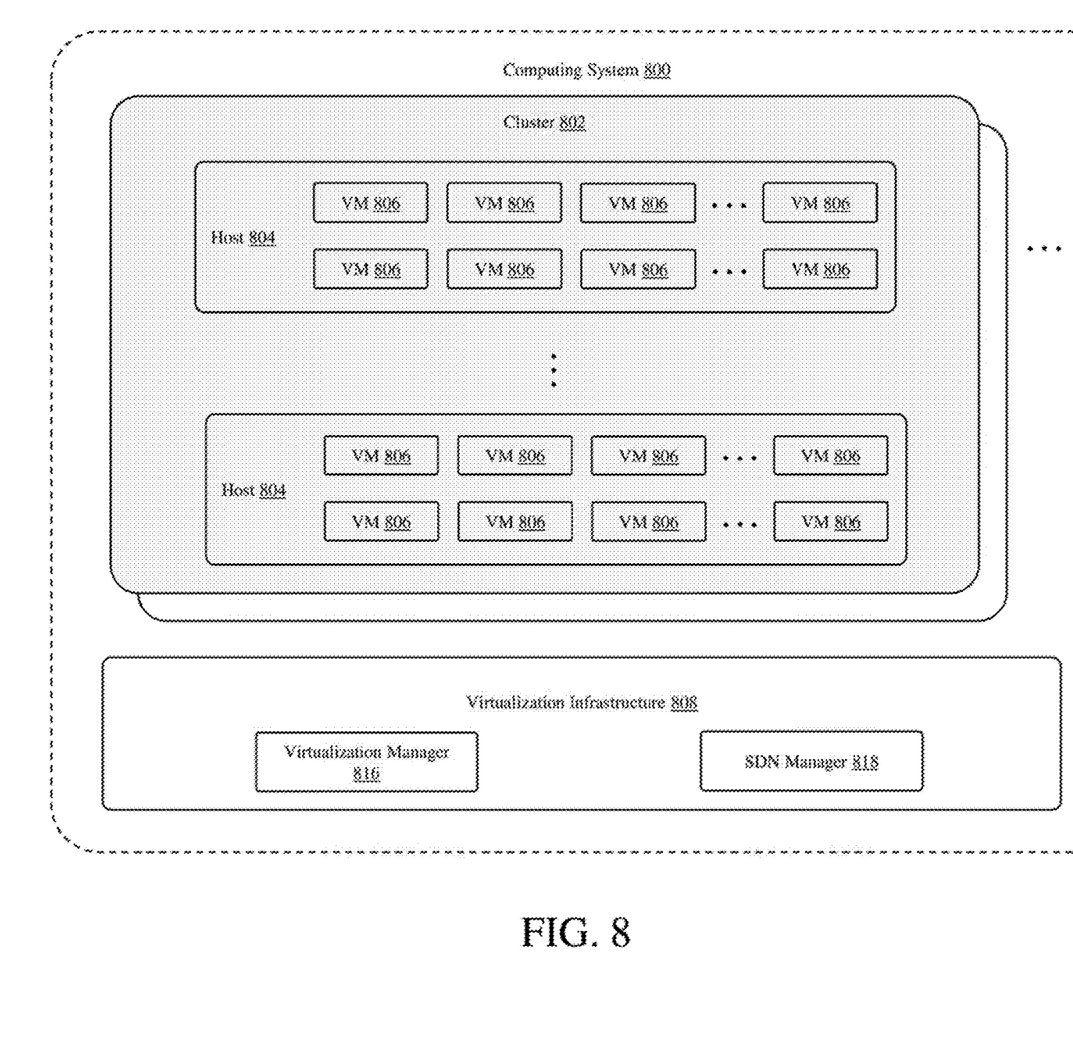
FIG. 8 is a block diagram of a computing system in accordance with another embodiment of the invention.

In some embodiments, the computer system in which embodiments of the invention are implemented may be a computer system with one or more virtual machine based clusters. For example, FIG. 8 shows a computer system 800 with one or more clusters 802, each of which includes a number of hosts 804 that support a number of virtual machines 806. The hosts 804 may be similar to the host 200 depicted in FIG. 2. The computing system 800 includes a virtualization infrastructure 808, which includes a number of management entities, such as a virtualization manager 816 and an SDN manager 818. The virtualization infrastructure 808 may be similar to the virtualization structure 108 depicted in FIG. 1. At least some of the management entities in the virtualization infrastructure 808 may employ techniques described herein to establish trust between each other.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for establishing trust between management entities with different authentication mechanisms in a computing system, the method comprising:
setting an endpoint at a first management entity as an authentication endpoint for a second management entity, wherein the first management entity uses a first token-based authentication mechanism and the second management entity uses a second token-based authentication mechanism;
creating a first account in the first management entity and a corresponding second account in the second management entity;
acquiring a first security token at the first management entity using the first account to access the second management entity;
acquiring a second security token from a token exchange service at the first management entity in exchange for the first security token;
sending a request with the second security token from the first management entity to the second management entity using the corresponding second account;
in response to the request, retrieving a public key from the first management entity by the second management entity using the authentication endpoint;
validating the second security token using the public key at the second management entity;
after validating the second security token, processing the request at the second management entity; and
after processing the request, sending a response to the request back to the first management entity from the second management entity.

2. The method of claim 1, wherein acquiring the first security token at the first management entity includes acquiring a security assertion markup language (SAML) token for a user identification for the first account at the first management entity to access the second management entity.

3. The method of claim 2, wherein acquiring the second security token from the token exchange service at the first management entity includes acquiring a JavaScript Object Notation (JSON) Web Token (JWT) token from the token exchange service at the first management entity in exchange for the SAML token.

4. The method of claim 1, wherein setting the endpoint at the first management entity as the authentication endpoint for the second management entity includes setting the endpoint at the first management entity as an OpenID connect (OIDC) endpoint for the second management entity.

5. The method of claim 4, wherein retrieving the public key from the first management entity by the second management entity using the authentication endpoint includes retrieving an OIDC public key from the first management entity by the second management entity using the OIDC endpoint.

6. The method of claim 1, further comprising registering the second management entity with a lookup service of the first management entity as a service to connect with the first management entity and requesting an endpoint of the second management entity from the lookup service to send the request to the second management entity from the first management entity.

7. The method of claim 1, further comprising restricting access to the second management entity using credentials, and after validating the second security token, authorizing the request using the credentials at the second management entity.

8. The method of claim 1, further comprising:
registering the second management entity with the first management entity as an extension of the first management entity; and
registering the first management entity with the second management entity as a compute manager of the second management entity.

9. A non-transitory computer-readable storage medium containing program instructions for establishing trust between management entities with different authentication mechanisms in a computing system, wherein execution of the program instructions by one or more processors of a computer system causes the one or more processors to perform steps comprising:
setting an endpoint at a first management entity as an authentication endpoint for a second management entity, wherein the first management entity uses a first token-based authentication mechanism and the second management entity uses a second token-based authentication mechanism;
creating a first account in the first management entity and a corresponding second account in the second management entity;
acquiring a first security token at the first management entity using the first account to access the second management entity;
acquiring a second security token from a token exchange service at the first management entity in exchange for the first security token;
sending a request with the second security token from the first management entity to the second management entity using the second account;
in response to the request, retrieving a public key from the first management entity by the second management entity using the authentication endpoint;
validating the second security token using the public key at the second management entity;
after validating the second security token, processing the request at the second management entity; and
after processing the request, sending a response to the request back to the first management entity from the second management entity.

10. The non-transitory computer-readable storage medium of claim 9, wherein acquiring the first security token at the first management entity includes acquiring a security assertion markup language (SAML) token for a user identification for the first account at the first management entity to access the second management entity.

11. The non-transitory computer-readable storage medium of claim 10, wherein acquiring the second security token from the token exchange service at the first management entity includes acquiring a JavaScript Object Notation (JSON) Web Token (JWT) token from the token exchange service at the first management entity in exchange for the SAML token.

12. The non-transitory computer-readable storage medium of claim 9, wherein setting the endpoint at the first management entity as the authentication endpoint for the second management entity includes setting the endpoint at the first management entity as an OpenID connect (OIDC) endpoint for the second management entity.

13. The non-transitory computer-readable storage medium of claim 12, wherein retrieving the public key from the first management entity by the second management entity using the authentication endpoint includes retrieving an OIDC public key from the first management entity by the second management entity using the OIDC endpoint.

14. The non-transitory computer-readable storage medium of claim 9, wherein the steps further comprise registering the second management entity with a lookup service of the first management entity as a service to connect with the first management entity and requesting an endpoint of the second management entity from the lookup service to send the request to the second management entity from the first management entity.

15. The non-transitory computer-readable storage medium of claim 9, wherein the steps further comprise restricting access to the second management entity using credentials, and after validating the second security token, authorizing the request using the credentials at the second management entity.

16. The non-transitory computer-readable storage medium of claim 9, wherein the steps further comprise:
registering the second management entity with the first management entity as an extension of the first management entity; and
registering the first management entity with the second management entity as a compute manager of the second management entity.

17. A system comprising:
memory coupled with at least one processor configured to:
set an endpoint at a first management entity as an authentication endpoint for a second management entity, wherein the first management entity uses a first token-based authentication mechanism and the second management entity uses a second token-based authentication mechanism;
create a first account in the first management entity and a corresponding second account in the second management entity;
acquire a first security token at the first management entity using the first account to access the second management entity;
acquire a second security token from a token exchange service at the first management entity in exchange for the first security token;
send a request with the second security token from the first management entity to the second management entity using the first account;
in response to the request, retrieve a public key from the first management entity by the second management entity using the authentication endpoint;
validate the second security token using the public key at the second management entity;
after the second security token has been validated, process the request at the second management entity; and
after the request has been processed, send a response to the request back to the first management entity from the second management entity.

18. The system of claim 17, wherein the first security token is a security assertion markup language (SAML) token and the second security token is a JavaScript Object Notation (JSON) Web Token (JWT) token.

19. The system of claim 17, wherein the authentication endpoint for the second management entity is an OpenID connect (OIDC) endpoint for the second management entity and the public key is an OIDC public key.

20. The system of claim 17, wherein the at least one processor is configured to register the second management entity with a lookup service of the first management entity as a service to connect with the first management entity and request an endpoint of the second management entity from the lookup service to send the request to the second management entity from the first management entity.

\* \* \* \* \*